United States Patent Office 3,222,635
Patented Dec. 7, 1965

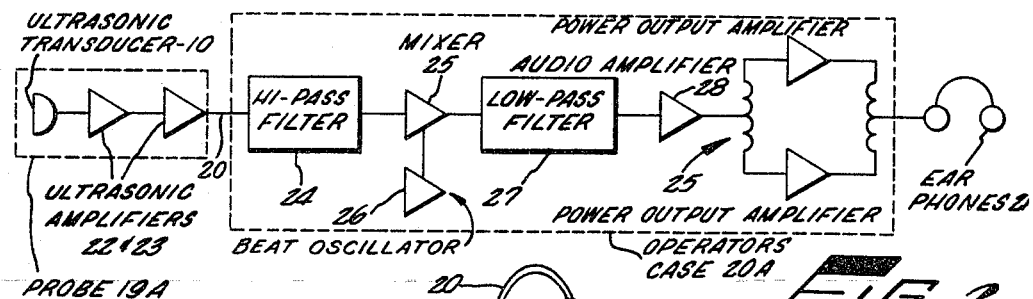
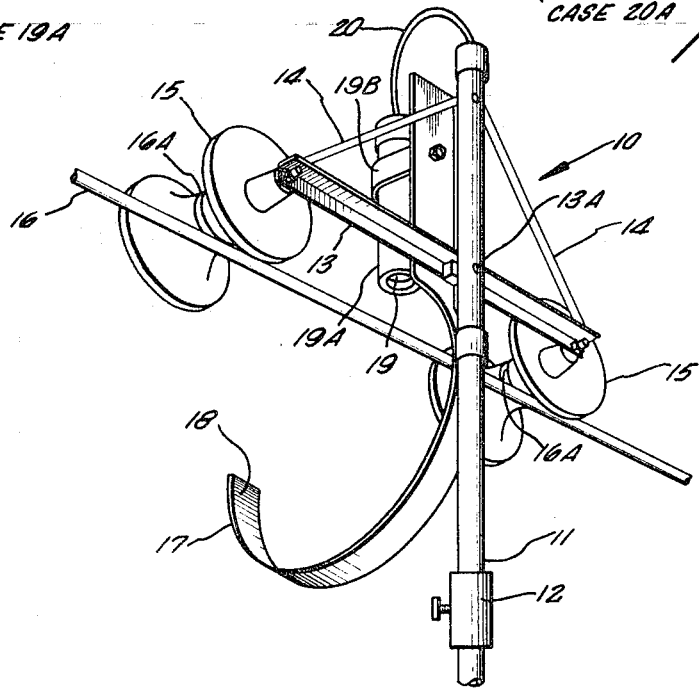
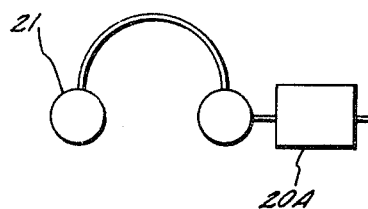

3,222,635
ULTRASONIC VIBRATION DETECTOR
Alan B. Simpkins, Los Altos, and Robert H. Hamilton, Menlo Park, Calif., assignors, by mesne assignments, to Hewlett-Packard Company, Palo Alto, Calif., a corporation of California
Filed Nov. 13, 1962, Ser. No. 236,956
12 Claims. (Cl. 340—15)

This invention is useful for locating the source of ultrasonic vibrations from a system which generates them.

The average human ear can convert vibrations in the range of about 16 to about 18,000 cycles per second into sound. The range above about 18,000 c.p.s. is known as the ultrasonic region, and the human ear is insensitive to it.

An important use of the invention is the detection and location of leaks in pressure and vacuum systems. Such leaks often generate ultrasonic vibrations, but are otherwise inconspicous without special testing equipment. The leaks can result in expensive losses, and sometimes create hazardous or toxic conditions. Therefore, it is important that they be located and repaired as quickly as possible.

In the past, pressure leaks have been detected by various means, including the use of a soap solution which is applied over an entire pressure system in the hope that the leaking area will be covered and disclosed by the formation of bubbles. The soap solution technique has been applied to pressurized telephone conduits which are often located 20 to 40 feet above street level. It requires expensive and even hazardous equipment for an operator to apply the soap solution in looking for the leaks, and the procedure is slow. This invention overcomes these difficulties.

Vacuum leaks are even more difficult to detect than pressure leaks, and have been tested with various means, including candle flames. Other systems for detection of vacuum leaks have required introduction into the system of foreign gases which are subsequently detected by various forms of gas detectors, including mass spectrometers. This invention eliminates the need of a special detector gas and expensive equipment, such as a mass spectrometer.

In short, this invention provides for the sensitive and efficient detection of both pressure and vacuum leaks without the mess of soap bubbles or the introduction of foreign gases, which sometimes require the shut-down of the equipment under test.

In addition to the detection of leaks, the invention also is a powerful tool in the analysis of mechanical action. For example, many mechanical failures are preceded by dry bearings which give off ultrasonic noise before the failure is visually, thermally, or audibly apparent. However, the failure can often be detected before serious or expensive damage occurs by sensing the characteristic vibrations in the ultrasonic range in accordance with this invention.

This invention provides apparatus which can reach areas of difficult accessibility, and monitor extensive regions quickly for ultrasonic vibrations in an efficient and safe manner for operating personnel.

Briefly, the apparatus includes a transducer for receiving ultrasonic vibrations and converting them into an electric signal. Preferably, circuit means are provided for converting the signal into audible sound so the ultrasonic vibration can be "heard" by an operator. A reflector is spaced from the transducer and shaped to fit around at least a portion of the system and reflect vibrations from the system to the transducer. For example, in using one embodiment of this invention to look for leaks in a pressurized cable conduit supported from utility poles, the transducer is supported above the conduit on a frame which has wheels that roll along the conduit. A curved reflector is attached to the frame and is disposed below the conduit to present a concave surface toward the transducer. In this way, as the apparatus is moved along the conduit, any leaks which are located in the upper portion of the conduit reach the transducer directly, and those leaks in the lower portion of the conduit are reflected to the transducer. Thus, leaks are detected around the entire circumference of the conduit while using only one transducer.

When the apparatus is used for checking telephone cables, power lines, and the like, suspended from utility poles, the transducer and reflector are preferably mounted on the upper end of an elongated hollow pole made of light weight insulating material, such as fiberglass. The necessary electrical leads extend from the transducer down through the hollow pole and are attached to earphones worn by an operator. In this way, extraneous audible noise is reduced to a minimum, and the operator can concentrate on listening for audible noise converted into sound as a result of detecting ultrasonic vibrations.

Preferably, the ultrasonic vibrations are detected by converting them into an alternating electrical signal above the audio range. A second alternating electrical signal of a frequency which differs from the first by an amount in the audio range, is mixed with the first signal to produce a side band which is in the audio range, preferably a frequency of about 5,000 c.p.s.

These and other aspects of the invention will be more fully understood from the following detailed description and the accompanying drawing, in which:

FIG. 1 is a perspective view of the presently preferred embodiment of the apparatus; and FIG. 2 is a schematic diagram of one type of circuit of converting ultrasonic vibrations into audible sound.

Referring to FIG. 1, a frame 10 is mounted on the upper end of a long hollow pole 11 made of a suitable electrical insulating material, such as fiberglass. The pole includes a plurality of telescoping joints 12 so that it may be extended and locked at various lengths.

The frame includes a longitudinal bar 13 secured at its center by a pivot pin 13A to a point adjacent the upper end of the pole. The bar is normally perpendicular to the pole and is urged toward that position by a pair of inclined elastic shock cords 14 attached at their respective lower ends to the opposite ends of the bar and at their respective upper ends to the upper end of the pole. A separate wheel 15 shaped like a pulley or spool is mounted on each end of the bar to ride on a system 16 under inspection. Preferably, the wheel is wooden, plastic, e.g., nylon, or other non-metallic material to reduce noise as it rolls, and it includes a central annular groove 16A to help center the wheel on the system on which it rides. The system may be any one of a large number of units, but for purposes of explanation, it is assumed to be a pressurized conduit for telephone cables supported above street level by utility poles (not shown).

An elongated reflector 17, in the shape of an inverted question-mark, is secured to the center of the bar so its upper portion is adjacent the upper end of the pole. The lower part of the reflector curves around and under the conduit to provide a concave surface 18 facing toward a transducer 19 secured in the lower open end of a probe 19A mounted by a bracket 19B on the upper portion of the reflector and located just above the conduit. Preferably, the transducer probe is mounted with its sensitive, or open, end down, i.e., facing toward the remote end of the pole. This minimizes extraneous effects such as rain or falling particles which may be jarred loose as the unit is rolled on the system under inspection and which might fall on to the sensitive end of the transducer if it were up.

The ultrasonic transducer can be of any conventional type, but preferably it is fairly selective to ultrasonic vibrations and rejects substantially all vibrations below about 20,000 c.p.s. The transducer is connected in an electric circuit as shown in FIG. 2, through an electrical cable 20 extending from the transducer probe down through the hollow pole to an operator's case 20A connected to a pair of earphones 21 at the lower end of the pole.

Referring to FIG. 2, the transducer 19 has its outlet coupled to a first ultarsonic amplifier 22 connected in cascade arrangement with a second ultrasonic amplifier 23. These two amplifiers are mounted as pre-amps in the probe. The output from the second amplifier is connected through the cable 20 to a high-pass filter 24 in the operator's case and designed to reject substantially all of the signal in the frequency range below about 15,000 c.p.s. The high frequency portion of the signal going through the high-pass filter is fed into a mixer 25 which also receives the output of an ultarsonic oscillator 26. Preferably, the ultrasonic oscillator has a frequency which differs from the incoming frequency from the high-pass filter by about 3,000 to about 5,000 c.p.s. The resulting family of frequencies from the mixer is subjected to a low-pass filter 27 which removes all frequencies with the exception of those below about 5,000 c.p.s. In other words, only the lower side band of the mixed signals goes through the low-pass filter.

The low frequency signal from the low-pass filter passes through an audio amplifier 28, and then through a power output amplifier stage 29, which drives the earphones. The circuit is supplied the necessary power by conventional means, which are not shown for the sake of simplicity.

In using the apparatus shown in FIG. 1, the pole is extended to the desired length and locked in that position. The operator turns on the circuit and places the earphones over his ears. The wheels are placed as shown in FIG. 1 to ride on the pressurized conduit, and the apparatus is rolled along the conduit by pulling the pole. The lower portion of the reflector is spaced far enough away from the conduit to clear any obstructions, such as insulators, splices, and the like. If a leak is encountered which generates ultrasonic vibrations, the vibrations either are picked up directly by the transducer, or else are reflected from the concave surface of the reflector to the transducer. The reflector also shields the sensitive end of the transducer from extraneous ultrasonic noises below the system under inspection, e.g., from ultrasonic noises generated by the operator walking through weeds. The circuit converts the ultrasonic vibrations into audible sound, and the operator is told instantly and safely the location of the leak, so that it can be repaired.

The pivotal mounting of the pole on the frame makes the unit easier to handle as the pole is pulled along. It also makes it easy to reverse the direction of pull to double back over a suspected leak area.

Thus, the operator is safely insulated from power lines by the insulating pole, and he does not have to use a ladder or the like to climb up to the conduit to apply soap solution.

We claim:

1. Apparatus for locating the source of ultrasonic vibrations from a system which generates them, the apparatus comprising an elongated pole, a transducer mounted on the pole for receiving the vibrations and converting them into an electric signal, and a reflector mounted on the pole and spaced from the transducer and shaped to fit around at least a portion of the system and reflect vibrations from the system to the transducer.

2. Apparatus for locating the source of ultrasonic vibrations from a system which generates them, the apparatus comprising an elongated hollow pole of electrically insulating material, a transducer mounted adjacent one end of the pole for receiving the vibrations and converting them into an electric signal, a reflector spaced from the transducer and shaped to fit around at least a portion of the system and reflect vibrations from the system to the transducer, a receiver for converting electric energy into sound at the other end of the pole, circuit means for converting the electric signal from the transducer into an alternating frequency in the audio range, the circuit means including an electrical conductor extending through the hollow pole and connected between the transducer and receiver.

3. Apparatus for locating the source of ultrasonic vibrations from an elongated member which generates them, the apparatus comprising a frame, a pair of rotatable wheels mounted on the frame and shaped to roll along the elongated member, a transducer mounted on the frame for receiving the vibrations and converting them into an electric signal, and a reflector mounted on the frame and spaced from the transducer and shaped to fit around at least a portion of the system and reflect vibrations from the system to the transducer.

4. Apparatus for locating the source of ultrasonic vibrations from a system which generates them, the apparatus comprising a frame, a pair of rotatable wheels mounted on the frame, a transducer mounted on the frame for receiving the vibrations and converting them into an electric signal, and a reflector mounted on the frame and spaced from the transducer, the reflector being shaped to present a concave surface toward the transducer and reflect vibrations from the system to the transducer.

5. Apparatus for locating the source of ultrasonic vibrations from a system which generates them, the apparatus comprising an elongated pole, means for adjusting the length of the pole, a transducer mounted on the pole for receiving the vibrations and converting them into an electric signal, and a reflector mounted on the pole and spaced from the transducer and shaped to fit around at least a portion of the system and reflect vibrations from the system to the transducer.

6. Apparatus for locating the source of ultrasonic vibrations from a system which generates them, the apparatus comprising an elongated pole, a transducer having a sensitive portion for receiving the vibrations and converting them into an electric signal, means mounting the transducer adjacent one end of the pole with the sensitive portion of the transducer facing toward the other end of the pole, and a reflector spaced from the transducer and shaped to fit around at least a portion of the system and reflect vibrations from the system to the transducer, the reflector being disposed between the sensitive portion of the transducer and the said other end of the pole.

7. Apparatus for locating the source of ultrasonic vibrations from a system which generates them, the apparatus comprising a pole, a frame mounted to pivot on the pole, a pair of rotatable wheels mounted on the frame and shaped to roll along the system, a transducer mounted on the frame for receiving the vibrations and converting them into an electric signal, and a reflector spaced from the transducer and shaped to fit around at least a portion of the system and reflect vibrations from the system to the transducer.

8. Apparatus for locating gas leaks in a system where ultrasonic vibrations are generated in the vicinity of the leaks, the apparatus comprising an elongated handle, an ultrasonic transducer adjacent one end of the handle, the transducer being directly exposed and in close proximity to the system for receiving the vibrations and converting them into an electric signal, means spaced from the transducer for converting the electrical signal from the transducer into a form perceptible to an observer, and means interconnecting the transducer and the converting means.

9. Apparatus for locating gas leaks in a system where ultrasonic vibrations are generated in the vicinity of the leaks, the apparatus comprising an elongated handle, an ultrasonic transducer adjacent one end of the handle, means secured to the handle adjacent the transducer for supporting the handle and the transducer from the system under test so the transducer is directly exposed and in close proximity to the system for receiving the vibrations and converting them into an electric signal, means spaced from the transducer for converting the electrical signal from the transducer into a form perceptible to an observer, and means interconnecting the transducer and the converting means.

10. Apparatus for locating gas leaks in a system where ultrasonic vibrations are generated in the vicinity of the leaks, the apparatus comprising an elongated handle, a rotatable wheel mounted on the handle and shaped to ride on the system to support the handle, an ultrasonic transducer adjacent one end of the handle, the transducer being directly exposed and in close proximity to the system for receiving the vibrations and converting them into an electric signal, means spaced from the transducer for converting the electrical signal from the transducer into a form perceptible to an observer, and means interconnecting the transducer and the converting means.

11. Apparatus for locating gas leaks in a system where ultrasonic vibrations are generated in the vicinity of the leaks, the apparatus comprising an elongated handle, a carriage mounted adjacent one end of the handle to pivot about a substantially horizontal axis, a pair of rotatable wheels mounted on the carriage and shaped to ride on the system, an ultrasonic transducer mounted adjacent the said one end of the handle, the transducer being directly exposed and in close proximity to the system for receiving the vibrations and converting them into an electric signal, means spaced from the transducer for converting the electrical signal from the transducer into a form perceptible to an observer, and means interconnecting the transducer and the converting means.

12. Apparatus for locating gas leaks in a system where ultrasonic vibrations are generated in the vicinity of the leaks, the apparatus comprising an elongated handle, an ultrasonic transducer adjacent one end of the handle, the transducer being directly exposed and in close proximity to one side of the system for receiving the vibrations and converting them into an electric signal, reflecting means mounted on the handle to be located on the opposite side of the system from the transducer to reflect vibrations emitted from the said opposite side toward the transducer, means spaced from the transducer for converting the electrical signal from the transducer into a form perceptible to an observer, and means interconnecting the transducer and the converting means.

References Cited by the Examiner
UNITED STATES PATENTS 3,028,450    4/1962    Manning _____ 181—.52 XR
3,036,457    5/1962    Wood et al. _____ 73—40.5

BENJAMIN A. BORCHELT, *Primary Examiner.*

CHESTER L. JUSTUS, *Examiner.*

T. H. TUBBESING, P. A. SHANLEY,
*Assistant Examiners.*